Figure 12:
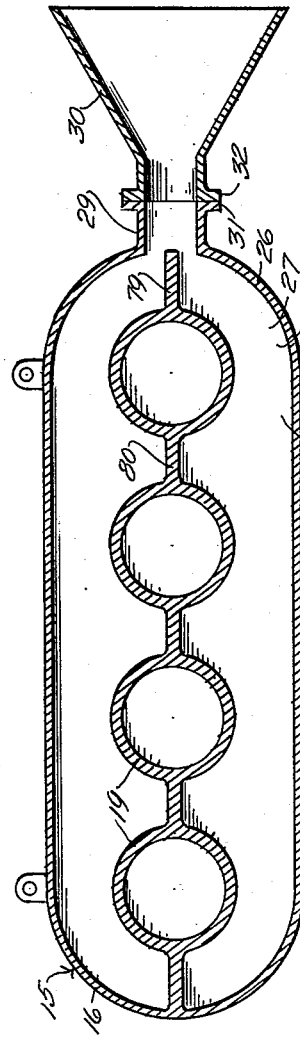

Jan. 30, 1940.          U. SAUER          2,188,444
COMBINED INTERNAL COMBUSTION ENGINE AND COOLING SYSTEM
Filed July 6, 1938          4 Sheets-Sheet 1
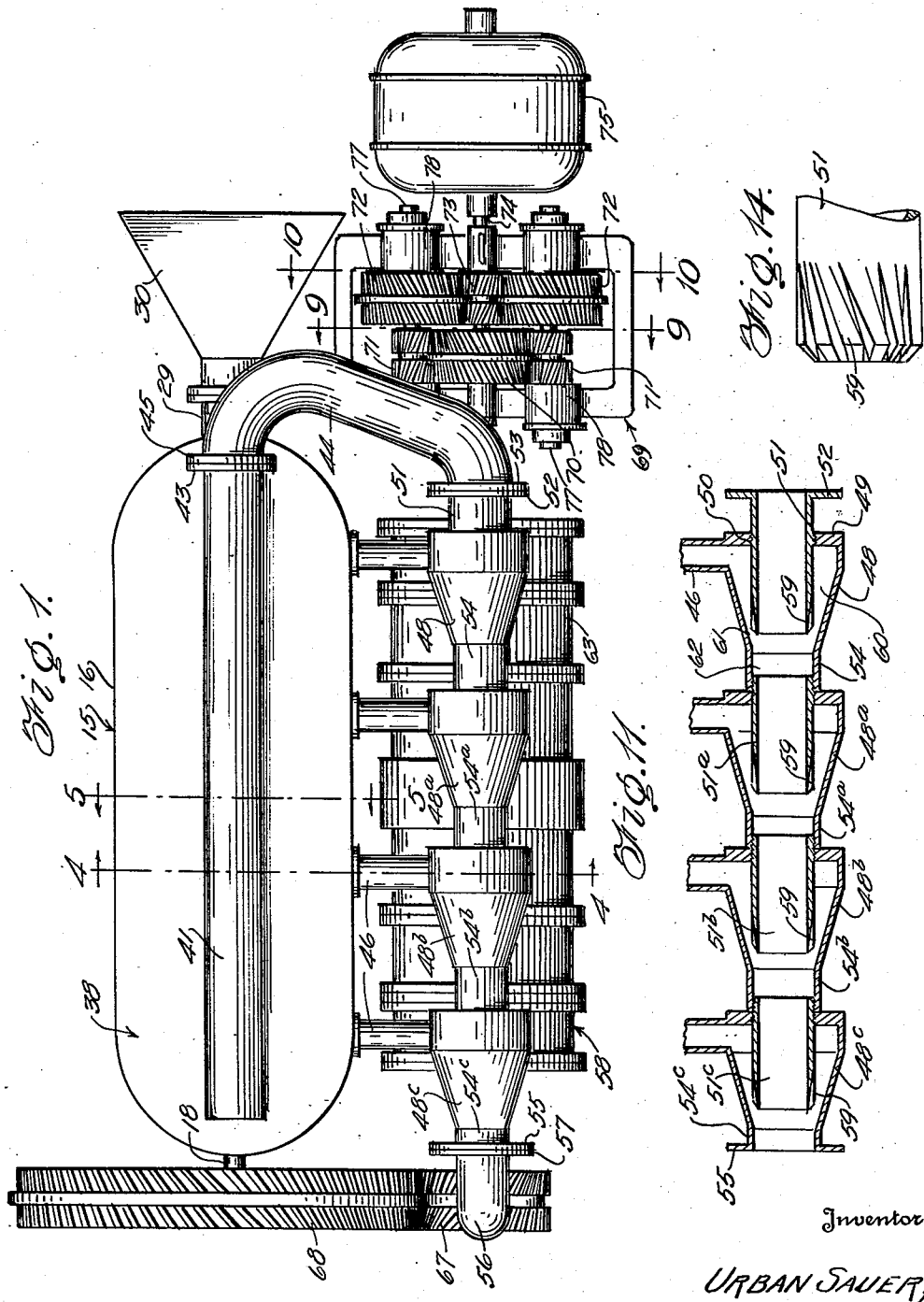
Inventor
URBAN SAUER,
By Kimmel & Crowell,
Attorneys.

Jan. 30, 1940.　　　U. SAUER　　　2,188,444
COMBINED INTERNAL COMBUSTION ENGINE AND COOLING SYSTEM
Filed July 6, 1938　　　4 Sheets-Sheet 2
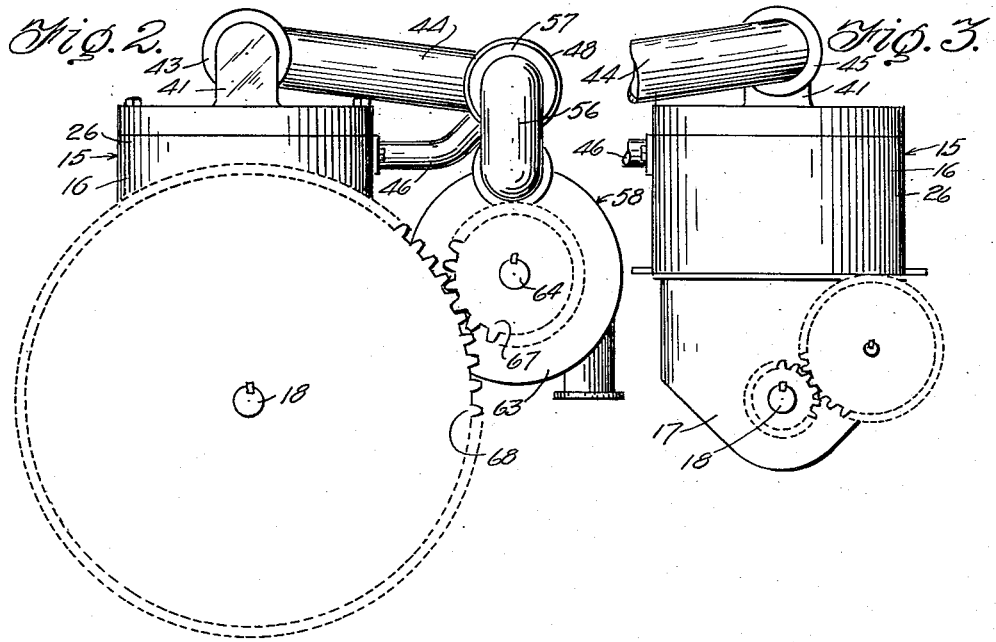
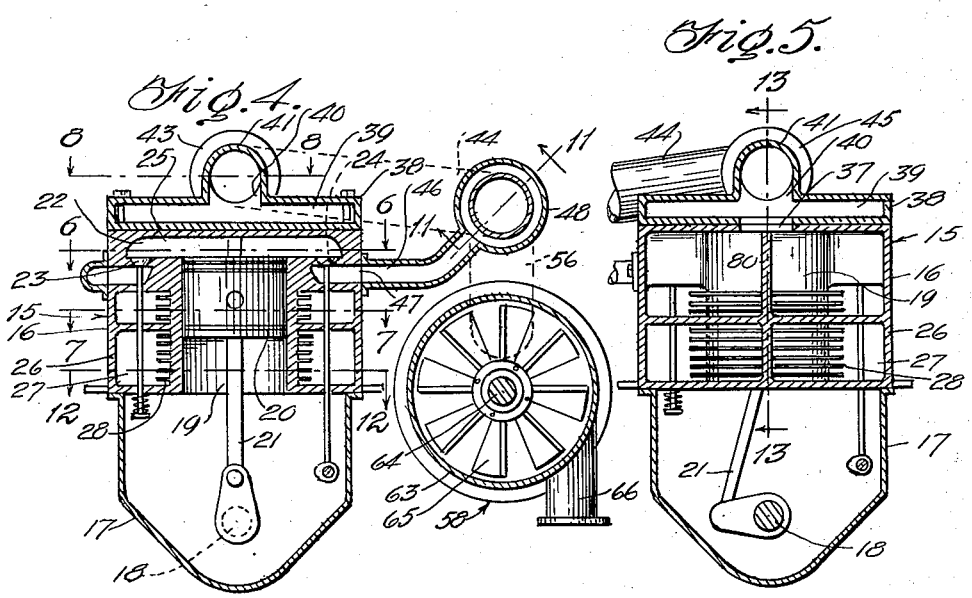
Inventor
URBAN SAUER,
By Kimmel & Crowell
Attorneys.

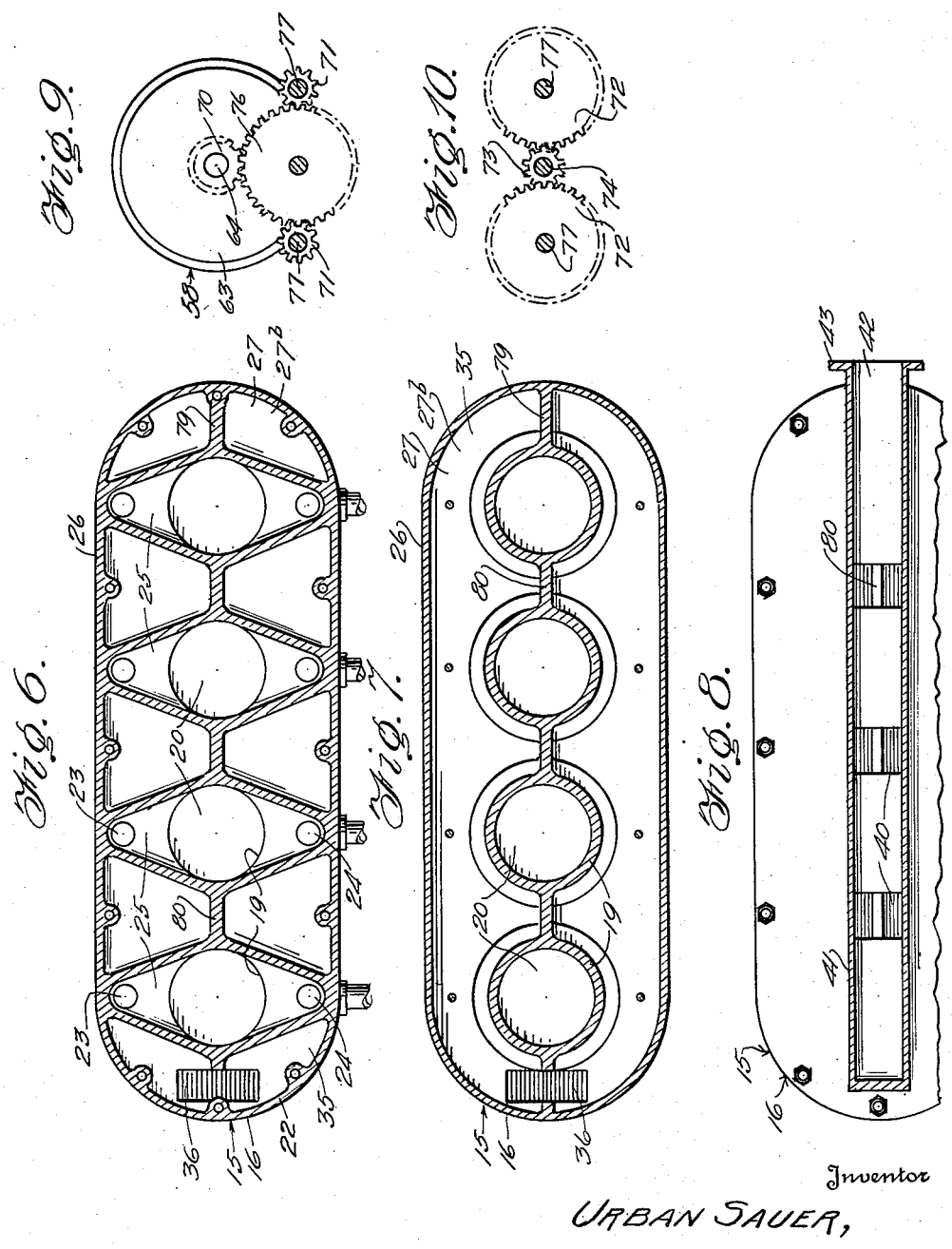

Jan. 30, 1940.          U. SAUER          2,188,444
COMBINED INTERNAL COMBUSTION ENGINE AND COOLING SYSTEM
Filed July 6, 1938          4 Sheets-Sheet 4

Inventor
URBAN SAUER,
By Kimmel & Crowell,
Attorneys

Patented Jan. 30, 1940

2,188,444

UNITED STATES PATENT OFFICE

2,188,444

COMBINED INTERNAL COMBUSTION ENGINE AND COOLING SYSTEM

Urban Sauer, Pittsburgh, Pa., assignor of one-third to Harry R. Levy, McKeesport, Pa.

Application July 6, 1938, Serial No. 217,764

7 Claims. (Cl. 60—13)

This invention relates to internal combustion engines and more particularly to a combination of an internal combustion engine and a turbine operable from the exhaust gases of the engine.

An object of this invention is to provide in an internal combustion engine means whereby the exhaust gases are utilized as a medium for effecting the cooling of the jacket about the cylinders.

Another object of this invention is to provide in an internal combustion engine means whereby the exhaust gases are not only used to effect cooling of the cylinders but also to actuate a supplemental power unit so that the full extent of the power in the gases will be utilized.

Another object of this invention is to provide a means whereby back pressure from the exhaust gases is eliminated.

Still another object of this invention is to provide a means in the form of an attachment which may be secured to the exhaust side of an internal combustion engine for the purpose of providing a circulating medium for circulating air through the jacket of a water cooled engine without changing the structure of the engine in order that the use of water as cooling medium may be eliminated.

A further object of this invention is to provide an improved internal combustion engine which may be connected to a supplemental power source deriving power from the exhaust gases in the form of a turbine so that the power derived from the exhaust will assist the main engine in relieving the load on the main engine.

A further object of this invention is to provide a means in the form of an attachment which may be secured to the exhaust side of an internal combustion engine for the purpose of supplementing the cooling system, eliminating back pressure from the exhaust gases, accumulations of carbon and generally increasing the efficiency of the engine.

To the foregoing objects and others which may hereinafter appear, the invention consists of the novel construction, combination and arrangement of parts as will be more specifically referred to and illustrated in the accompanying drawings wherein is disclosed an embodiment of the invention, but it is to be understood that changes, variations and modifications may be resorted to which fall within the scope of the invention as claimed.

Figure 13:
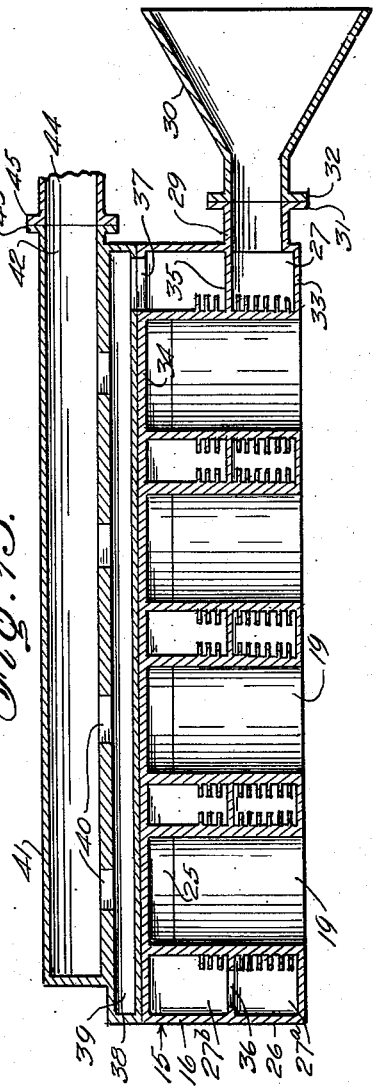

In the drawings:

Figure 1 is a detail top plan of an internal combustion engine having a supplemental power means constructed according to an embodiment of this invention connected therewith, the supplemental power means being partly uncovered to show the interior construction thereof, Figure 2 is a detail end elevation of one end of the engine, Figure 3 is a fragmentary section taken on the line 3—3 of Figure 1, Figure 4 is a sectional view taken on line 4—4 of Figure 1, Figure 5 is a fragmentary sectional view taken on the line 5—5 of Figure 1, Figure 6 is a sectional view taken on the line 6—6 of Figure 4, Figure 7 is a sectional view taken on the line 7—7 of Figure 4, Figure 8 is a sectional view taken on the line 8—8 of Figure 4, Figure 9 is a sectional view taken on the line 9—9 of Figure 1, Figure 10 is a sectional view taken on the line 10—10 of Figure 1, Figure 11 is a sectional view taken on the line 11—11 of Figure 4, Figure 12 is a sectional view taken on the line 12—12 of Figure 4, Figure 13 is a sectional view taken on the line 13—13 of Figure 5, and Figure 14 is a detail side elevation of one of the air tubes.

Referring to the drawings and first to Figures 2 to 5 inclusive the numeral 15 designates generally an internal combustion engine comprising a jacket 16 mounted on a block 17. A crank shaft 18 is journalled in the block 17 and the jacket 16 includes a plurality of cylinders 19 having pistons 20 slidable therein. The pistons 20 are connected to the crank shaft 18 by means of connecting rods 21. The engine 15 is provided with a head generally designated as 22 having intake valves 23 at one side thereof and exhaust valves 24 at the opposite side thereof. A combustion chamber 25 is provided at the top of each cylinder 19 and communicates with the intake and exhaust valves 23 and 24 respectively. The intake valves 23 are operated in the conventional manner by cam means connected to the crank shaft 18 and the exhaust valves 24 are similarly operated. The general construction of the engine hereinbefore described is substantially conventional and it will be understood that the usual ignition means is associated with the head 22 so as to explode the compressed gases in the combustion chamber 25.

The jacket 16 comprises an outer wall 26 which is spaced from the cylinder wall 19 so as to provide a fluid passage 27 therebetween. Each cylinder 19 is provided on the periphery thereof with a plurality of heat exchanging fins or flanges 28 which project into the fluid chamber 27. The jacket 16 at one end thereof is provided with an intake nipple 29 to which an air intake member 30 in the form of a funnel is adapted to be connected. In the present instance, the nipple 29 is provided with a flange 31 and the funnel or intake member 30 is also provided with a flange 32 which may be secured to the flange 31 by suitable fastening devices such as bolts or the like.

The jacket 16 is provided at a point intermediate the lower wall 33 thereof and the upper wall 34 with a partition 35, and the end of the jacket opposite from the intake member 29 is provided with a port 36 so that the air from the lower chamber 27ª may rise into the upper chamber 27ᵇ. The incoming air which enters the lower chamber 27ª passes about the cylinders 19 contacting with the fins or blades 28 and then rises at the opposite end of the jacket 16 into the upper chamber 27ᵇ. The air then returns in the direction of the first or intake end and then is discharged through a discharge port 37 provided in the upper wall 34 of the jacket 16. The air after leaving the discharge port 37 enters an upper manifold 38 provided with an air chamber 39 and this air chamber 39 communicates through a plurality of outlet ports 40 with an upper manifold 41. The upper manifold 41 is constructed in the form of a tube which has an outlet 42 at the same end as the intake 29. The manifold 41 has a flange 43 at the outlet end thereof and a connecting pipe 44 having a flange 45 at one end is adapted to be bolted or otherwise secured to the flange 43.

A pipe 46 is connected at one end to an exhaust port 47 and at the opposite end is connected to a housing or substantially frusto-conical member 48. The housing or member 48 at one end of the series of these members as disclosed in Figure 11 is provided with an end wall 49 having a threaded opening 50 therein in which an air intake nipple or member 51 is threaded. This intake member 51 is provided with an outer flange 52 which is adapted to be bolted or otherwise secured to a flange 53 carried by the opposite end of the connecting pipe 44. As shown in Figure 11 there are four of these housings 48, 48ª, 48ᵇ and 48ᶜ. The housing 48 is provided with a cylindrical forward end portion 54 which is adapted to be threaded onto the projecting end of an inner tube 51ª. The housing 48ª is also provided with a cylindrical portion 54ª threadably engaging the projecting end of the tube 51ᵇ. The housing 48ᵇ is provided with a cylindrical forward portion 54ᵇ threadably engaging the projecting end of the tube 51ᶜ. The forward end of the housing 48ᶜ is provided with a cylindrical portion 54ᶜ having a flange 55 which may be connected to a pipe 56 having a flange 57 and the opposite end of the pipe 56 is connected to a turbine structure 58 of the lower pressure type.

Each air tube 51 is provided on the inner end thereof and on the periphery with a plurality of spirally arranged ribs or blades 59 and the inner or terminal end of each tube 51 is disposed closely adjacent the apex of the frusto-conical member 48 so that the exhaust gases entering the chamber 60 of the housing 48 will discharge through a relatively narrow passage 61 between the inner end of the tube 51 and the apex of the housing 48 and in moving forwardly into the cylindrical portion 54 or expansion chamber 52 the exhaust gases will assume a rotary or spiral movement about the inner open end of the tube 51. In this manner the flow of the exhaust gases from the chamber 60 to the chamber 62 will cause a suction of air through the tube 51 and this suction in the tube 51 will draw air from the jacket 16 through the pipe 44.

The turbine 58 comprises a housing 63 having a shaft 64 journalled therein to which are secured rotary blades comprising a rotor 65. It will also be understood that stator blades are mounted in the housing 63 and that the general construction of the turbine 58 is substantially conventional and of a type to operate under relatively low pressure. After the combined gases and air pass through the turbine, the combined gases are discharged through a discharge member 66 which may be connected to a suitable carry off means.

The shaft 64 is provided at one end with a gear 67 which is adapted to mesh with a gear 68 secured to the main crank shaft or drive member 18. As shown in Figure 1 the gears 67 and 68 are of what is known as the herringbone type but it will be understood that any suitable type of spur gears or the like may be used for rotatably connecting the turbine shaft 64 with the internal combustion shaft 18.

The opposite end of the turbine shaft 64 is connected to a transmission generally designated as 69 which in the present instance is of the reduction type. The transmission 67 includes a driving gear 70 secured to the turbine drive shaft 64 and meshing with a counter-gear 76. The counter-gear 76 meshes with a pair of relatively small counter-gears 71. The counter-gears 71 are connected to substantially large counter-gears 72 which mesh with a driven gear 73 mounted on a driven shaft 74. In the present instance the driven shaft 74 is connected to a generator 75. The counter-gears 71 and 72 are fixed to countershafts 77 which are adapted to be journalled in bearings 78 carried by the reduction gear member 69.

The jacket 16 is provided in the longitudinal center thereof with vertical walls 79 and 80, the walls 79 being disposed between the outermost of the cylinders 19 and the end wall of the jacket 16 and the walls 80 being disposed between the intermediate or inner cylinders 19.

In the use and operation of this improved engine, the internal combustion engine will be operated in the usual manner with the gas entering the intake chamber 25 past the valve 23 so as to operate the piston 20 and rotate the crank shaft 18. When the internal combustion engine is operating the exhaust gases will pass out through the exhaust port 47 and enter the casings 48, 48ª, 48ᵇ and 48ᶜ. The spirals 59 on the tubes 51, 51ª, 51ᵇ and 51ᶜ will cause the gases in the respective chambers 60 to assume a rotary motion about the tapered ends of the tubes 51, 51ª, 51ᵇ and 51ᶜ and thereby produce a suction longitudinally through the tubes. This will draw the air longitudinally through the tubes and as suction is created in these tubes, the air will be drawn through the pipe 40 and through the chambers 27 and 27ᵇ of the jacket 16. The intake end of the jacket 16 is open and provided with the funnel 30 so that the forward movement of the vehicle will also have a tendency to force the air through the interior of the jacket 16. After the combined air and gas leave the injector structure, this combined air and gas will then enter the turbine 58 so as to effect rotation of the turbine. It will also be understood that by connecting the turbine directly with the drive shaft 18 of the main engine, there will be a tendency of the main engine to also drive the turbine. The load however, on the main engine will be relieved as the exhaust gases expand and effect operation of the turbine so that the main engine will be relieved substantially of the load necessary to operate the generator 75.

It will be apparent from the foregoing that the turbine will act as a load relieving element so as to relieve the main engine of the entire load necessary to operate the generator 75. By relieving the main engine of the entire load on the generator 75, there will naturally be a considerable saving in fuel and other economies will be effected in the operation of the main engine.

This device not only provides an auxiliary power supply for an internal combustion engine which will act to relieve at least a portion of the load necessary to operate the generator, but this combination will also eliminate the necessity of using water as a cooling medium so that the various parts associated with a water cooling system may be thereby eliminated. At least one of these parts includes a pump which also requires power from the main engine so that this additional power may be used for other purposes.

By means of this combination the hot exhaust gases will act as a power generating means being combined with relatively cool air so that there will be sufficient expansion to operate the low pressure turbine.

While I have shown a suction device connected to the exhaust side of the engine 15 wherein separate exhaust chambers 48 are provided for each exhaust port, it will be understood that the exhaust gases from all of the exhaust ports may discharge into a common or single chamber 48 and with a construction of this kind only one air tube 51 will be necessary.

What I claim is:

1. In combination, an internal combustion engine including a bank of spaced cylinders having intakes and exhausts, a low pressure turbine operatively connected with and driven from said engine, said turbine provided with an intake for a mixture of a cooling medium and exhaust gases, a jacket common to and enclosing in spaced relation said cylinders, said jacket being formed with horizontally disposed means to provide therein superposed communicating cooling medium receiving chambers surrounding said cylinders, said lower chamber having a cooling medium inlet, said upper chamber being provided with a cooling medium outlet, a hollow structure mounted on said jacket forming a cooling medium receiving chamber having a plurality of spaced outlet ports, the outlet of the upper chamber formed by the jacket opening into said third chamber, a Venturi forming means having a cooling medium intake and an outlet for said mixture permanently opening into the intake of the turbine, a cooling medium conducting-off means common to said outlet ports and opening into the intake of the said Venturi forming means, and means leading from the exhausts of said cylinders for conducting off exhaust gases and for delivering same into said Venturi forming means at spaced points of the length of the latter.

2. In combination, an internal combustion engine including a bank of spaced cylinders having intakes and exhausts, a low pressure turbine operatively connected with and driven from said engine, said turbine provided with an intake for a mixture of a cooling medium and exhaust gases, a jacket common to and enclosing in spaced relation said cylinders, said jacket being formed with horizontally disposed means to provide therein superposed communicating cooling medium receiving chambers surrounding said cylinders, said lower chamber having a cooling medium inlet, said upper chamber being provided with a cooling medium outlet, a hollow structure mounted on said jacket forming a cooling medium receiving chamber having a plurality of spaced outlet ports, the outlet of the upper chamber formed by the jacket opening into said third chamber, a Venturi forming means having a cooling medium intake and an outlet for said mixture permanently opening into the intake of the turbine, a cooling medium conducting-off means common to said outlet ports and opening into the intake of the said Venturi forming means, and means leading from the exhausts of said cylinders for conducting off exhaust gases and for delivering same into said Venturi forming means at spaced points of the length of the latter, said jacket being formed therein with upstanding means common to and for dividing each of its chambers into a pair of compartments.

3. In combination, an internal combustion engine including a bank of cylinders and means to provide for circulating a cooling medium about said cylinders, said means being formed with an intake and an outlet, a low pressure turbine operatively driven from said engine and provided with an intake, a Venturi structure including a series of tandemwise arranged open front outer housings having forward and rear end parts, tapered intermediate parts and rear end walls, said structure including a set of axially aligned spaced tandemwise arranged inner annular members of uniform diameter secured intermediate their ends to said end walls and spaced from said intermediate parts, the rearmost member of said set constituting a combined inlet and conductor, the other members of said set constituting conductors, the foremost housing of said series constituting an outlet, the rear portions of the forward members of said set coacting with the forward end parts of the rear housings of said series for coupling the housings together, spaced means for establishing communication between the exhausts of the cylinders and the rear end parts of said housings, means for establishing communication between the outlet of said cooling medium circulating means and the inlet of said structure, and means for establishing communication between the outlet of said structure and the inlet of said turbine.

4. In combination, an internal combustion engine including a bank of cylinders and means to provide for circulating a cooling medium about said cylinders, said means being formed with an intake and an outlet, a low pressure turbine operatively driven from said engine and provided with an intake, a Venturi structure including a series of tandemwise arranged open front outer housings forward and rear end parts, tapered intermediate parts and rear end walls, said structure including a set of axially aligned spaced tandemwise arranged inner annular members of uniform diameter secured intermediate their ends to said end walls and spaced from said intermediate parts, the rearmost member of said set constituting a combined inlet and conductor, the other members of said set constituting conductors, the foremost housing of said series constituting an outlet, the rear portions of the forward members of said set coacting with the forward end parts of the rear housings of said series for coupling the housings together, spaced means for establishing communication between the exhausts of the cylinders and the rear end parts of said housings, means for establishing communication between the outlet of said cooling medium circulating means and the inlet of said structure, and means for establishing communication between the outlet of said structure and the inlet of said turbine, each of said members having substantially lengthwise disposed inherent spaced curved parts arranged circumferentially of the forward end terminal portion of its outer periphery for imparting a spiral movement to the exhaust gases entering the housings.

5. In combination, an internal combustion engine including a bank of cylinders and means to provide for circulating a cooling medium about said cylinders, said means being formed with an intake and an outlet, a low pressure turbine operatively driven from said engine and provided with an intake, a Venturi structure including a series of tandemwise arranged open front outer housings having forward and rear end parts, tapered intermediate parts and rear end walls, said structure including a set of axially aligned spaced tandemwise arranged inner annular members of uniform diameter secured intermediate their ends to said end walls and spaced from said intermediate parts, the rearmost member of said set constituting a combined inlet and conductor, the other members of said set constituting conductors, the foremost housing of said series constituting an outlet, the rear portions of the forward members of said set coacting with the forward end parts of the rear housings of said series for coupling the housings together, spaced means for establishing communication between the exhausts of the cylinders and the rear end parts of said housings, means for establishing communication between the outlet of said cooling medium circulating means and the inlet of said structure, and means for establishing communication between the outlet of said structure and the inlet of said turbine, the end parts of each housing being of annular form and coaxially arranged, each housing having its rear end part of greater diameter than the front end part thereof.

6. In combination, an internal combustion engine including a bank of cylinders and means to provide for circulating a cooling medium about said cylinders, said means being formed with an intake and an outlet, a low pressure turbine operatively driven from said engine and provided with an intake, a Venturi structure including a series of tandemwise arranged open front outer housings having forward and rear end parts, tapered intermediate parts and rear end walls, said structure including a set of axially aligned spaced tandemwise arranged inner annular members of uniform diameter secured intermediate their ends to said end walls and spaced from said intermediate parts, the rearmost member of said set constituting a combined inlet and conductor, the other members of said set constituting conductors, the foremost housing of said series constituting an outlet, the rear portions of the forward members of said set coacting with the forward end parts of the rear housings of said series for coupling the housings together, spaced means for establishing communication between the exhausts of the cylinders and the rear end parts of said housings, means for establishing communication between the outlet of said cooling medium circulating means and the inlet of said structure, and means for establishing communication between the outlet of said structure and the inlet of said turbine, the end parts of each housing being of annular form and coaxially arranged, each housing having its rear end part of greater diameter than the front end part thereof, the forward ends of said members being spaced rearwardly from the front end parts of said housing.

7. In combination, an internal combustion engine including a bank of cylinders, and means to provide for circulating a cooling medium about said cylinders, said means being formed with an intake and an outlet, a low pressure turbine operatively driven from said engine and provided with an intake, a Venturi structure including a series of tandemwise arranged open front outer housings having forward and rear end parts, tapered intermediate parts and rear end walls, said structure including a set of axially aligned spaced tandemwise arranged inner annular members of uniform diameter secured intermediate their ends to said end walls and spaced from said intermediate parts, the rearmost member of said set constituting a combined inlet and conductor opening at its forward end into the intermediate part of the rearmost housing of the series, the other members of said set constituting conductors opening at their forward ends into the intermediate parts of the forward housings of the series and opening at their rear ends into the forward parts of the rear housings of the series, the foremost housing of said series constituting an outlet, the rear portions of the forward members of said set co-acting with the forward end parts of the rear housings of said series for coupling the housings together, spaced means for establishing communication between the exhausts of the cylinders and the rear end parts of said housings, means for establishing communication between the outlet of said cooling medium circulating means and the inlet of said structure, and means for establishing communication between the outlet of said structure and the inlet of said turbine.

URBAN SAUER.